United States Patent
Worley

(10) Patent No.: US 12,365,212 B2
(45) Date of Patent: Jul. 22, 2025

(54) ELECTRONICALLY ADJUSTABLE SWAY BAR LINK

(71) Applicant: Suspension Direct Inc., Lake Elsinore, CA (US)

(72) Inventor: Daniel J. Worley, Lake Elsinore, CA (US)

(73) Assignee: Suspension Direct Inc., Lake Elsinore, CA (US)

( * ) Notice: Subject to any disclaimer, the term of this patent is extended or adjusted under 35 U.S.C. 154(b) by 0 days.

(21) Appl. No.: 18/930,831

(22) Filed: Oct. 29, 2024

(65) Prior Publication Data
US 2025/0050698 A1 Feb. 13, 2025

Related U.S. Application Data

(63) Continuation of application No. 18/108,474, filed on Feb. 10, 2023, now Pat. No. 12,157,341.
(Continued)

(51) Int. Cl.
*B60G 17/015* (2006.01)
*B60G 17/08* (2006.01)
*B60G 21/055* (2006.01)

(52) U.S. Cl.
CPC ..... *B60G 17/0157* (2013.01); *B60G 17/0155* (2013.01); *B60G 17/08* (2013.01);
(Continued)

(58) Field of Classification Search
CPC ............ B60G 17/0157; B60G 2202/44; B60G 21/0558; B60G 2202/24;
(Continued)

(56) References Cited

U.S. PATENT DOCUMENTS 1,743,591 A * 1/1930 Blanchard ............... F16F 9/185
188/313
2,004,380 A * 6/1935 Nickelsen ............... F16F 9/185
188/315
(Continued)

FOREIGN PATENT DOCUMENTS

DE 102021212104 4/2023
DE 102021212104 A1 * 4/2023 ............... F16F 9/46
(Continued)

*Primary Examiner* — Paul N Dickson
*Assistant Examiner* — Matthew D Lee
(74) *Attorney, Agent, or Firm* — Concourse Law Group; Katherine B. Sales, Esq.

(57) ABSTRACT

This invention pertains to sway bar systems, and a method of controlling their operation. Specifically, the present invention relates to provide a way of adjusting the response characteristics of a sway bar system by changing the structure of the typical sway bar links and regulating the modified structure by utilizing an electronically adjustable sway bar link. Said electronically adjustable sway bar link comprises a twin tube cylinder filled with mixed incompressible fluid and pressurized gas and forms a determined volume in order to host pressurized gas higher than fluid flow regulation functions, permitting a directional control valve to always remain fully submerged in incompressible fluid and to modify the fluid path between each tube of said twin tube cylinder, allowing closed or opened fluid flow operation, determined by a controlling device receiving an electronic input and piloting said directional control valve.

27 Claims, 3 Drawing Sheets

Related U.S. Application Data

(60) Provisional application No. 63/309,503, filed on Feb. 11, 2022.

(52) U.S. Cl.
CPC .... B60G 21/0558 (2013.01); *B60G 2202/135* (2013.01); *B60G 2202/413* (2013.01); *B60G 2202/44* (2013.01)

(58) Field of Classification Search
CPC ........ B60G 2204/1224; B60G 2500/11; B60G 21/0553; F16F 9/185; F16F 9/3257
See application file for complete search history.

(56) References Cited

U.S. PATENT DOCUMENTS

| | | | |
|---|---|---|---|
| 2014/0216871 A1* | 8/2014 | Shibahara | F16F 9/348 188/313 |
| 2017/0058987 A1* | 3/2017 | Nakano | F16F 9/464 |
| 2017/0284495 A1* | 10/2017 | Matsumoto | F16F 9/3257 |
| 2019/0136932 A1* | 5/2019 | Deferme | F16F 9/46 |
| 2021/0086579 A1* | 3/2021 | Cendoya | F16F 9/187 |
| 2021/0114431 A1* | 4/2021 | Cox | B60G 17/08 |
| 2021/0229519 A1* | 7/2021 | Tsiaras | F16F 9/56 |
| 2023/0213081 A1* | 7/2023 | Michener | B60G 13/08 188/266.1 |
| 2023/0271473 A1* | 8/2023 | Strickland | F16F 9/063 280/124.106 |
| 2023/0311843 A1* | 10/2023 | Ohno | B60W 10/30 701/22 |

FOREIGN PATENT DOCUMENTS

| | | | | |
|---|---|---|---|---|
| JP | 61166715 | | 2/1988 | |
| WO | 2007009907 | | 1/2007 | |
| WO | WO-2007009907 A1 | * | 1/2007 | ........... B60G 17/019 |

* cited by examiner

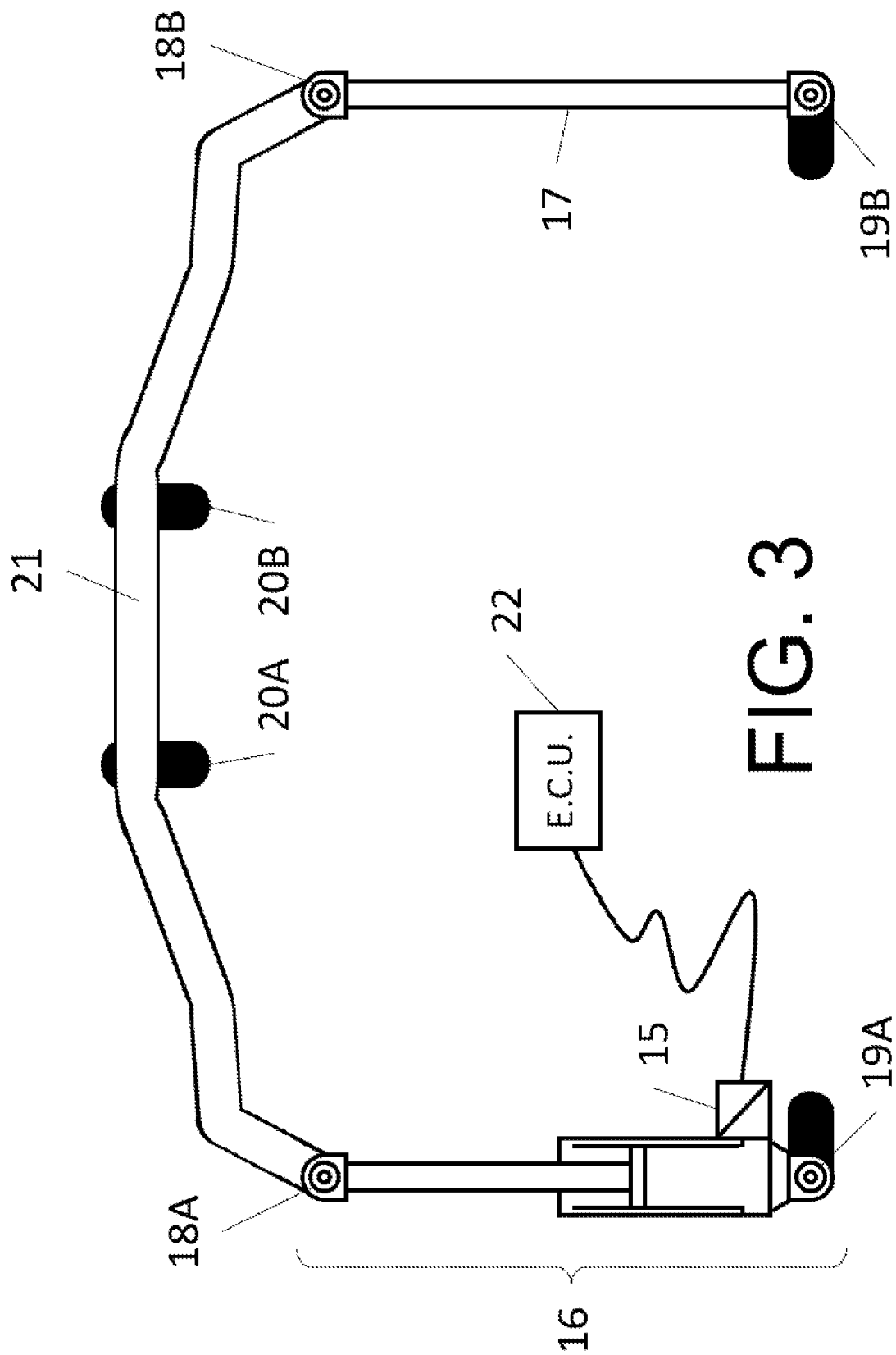

ELECTRONICALLY ADJUSTABLE SWAY BAR LINK

CROSS-REFERENCE RELATED TO APPLICATIONS

This application is a continuation application of U.S. Non-Provisional application Ser. No. 18/108,474, titled "Electronically Adjustable Sway Bar Link," filed Feb. 10, 2023, which claims the benefit of U.S. Provisional Patent Application Ser. No. 63/309,503, filed Feb. 11, 2022. The entire contents of Application Ser. No. 63/309,503 and Ser. No. 18/108,474 are hereby incorporated by reference herein in their entirety.

FIELD OF THE INVENTION

This invention pertains to sway bar systems, and a method of controlling their operation. Specifically, this invention relates to use of a hydraulic cylinder allowing control of the displacement of a sway bar on a vehicle, and to use of one electronic control unit to regulate flow of fluid within said hydraulic cylinder.

BACKGROUND OF THE INVENTION

Sway bar, anti-sway bar, roll bar or anti-roll bar systems for vehicles typically function by forcibly maintaining both right and left sides of said vehicle leveled. In detail, a sway bar is coupled to a vehicle frame, each right and left end of said sway bar are respectively connected to vehicle's right and left wheel axle thanks to sway bar links. Said sway bar acts like a torsion spring helping vehicle's suspension to maintain vehicle leveled.

Heretofore, the general approach for adjusting the response characteristics of this sway bar system has been to modify the length of said sway bar links. More specifically, this has been accomplished by replacing said sway bar links by adjustable hydraulic dampers, controlled manually or electronically.

Past manually or electronically controlled sway bar damper links utilize a manual or electronic control device, such as valves piloted by solenoids, located on each said sway bar damper links. By controlling said valves, a fluid path is opened allowing fluid to flow between a damper link cylinder and its own fluid reserve, resulting in a change of damping characteristics of said sway bar links, and so of the entire vehicle's sway bar system.

In more common sway bar systems, response characteristic adjustment works in a way that sway bar links are disconnected from vehicle's wheel axle sides, allowing right and left vehicle's sides to travel independently and without the resistance of the vehicle sway bar torsion spring characteristic.

Examples of such electronically controlled sway bar damper links are described and shown in US Patent US 2019/0100071 A1, and depict a sway bar system composed of at least one electronically controlled damper links, each electronically controlled damper links comprising its own fluid reserve cylinder, and its own electronic valve.

In the event of using two damper links on each side of the vehicle and independently controlling each sway bar links through its own electronic control system, such design would significantly rise the production cost of said sway bar system, in addition of increasing the total amount of electric energy required to use said sway bar system.

In any event, such sway bar system includes sway bar links that do not use a mix of fluid and gas in their main damper cylinder, and to function properly need their own fluid reserve comprising a fluid chamber, a gas chamber, and an internal floating piston, which would significantly rise the production cost of said sway bar system, and create a difficulty in adapting such system to any vehicle, as freeing enough room to mount such design around a vehicle wheel area can be hard to achieve.

Finally, such design does not describe a way to hydraulically control its system while not electronically controlled. By doing so, said sway bar system constantly relies on electronic inputs in order to function properly, which would also increase the total amount of electric energy required to use said sway bar system, and more importantly, in the event of an electric failure, such sway bar system would not be usable anymore, and the safety of the vehicle and users would be compromised.

To achieve optimum electronic control of a vehicle's sway bar system response characteristic, it would be advantageous to develop innovative devices allowing efficient and compact valve control.

SUMMARY OF THE INVENTION

This invention pertains to sway bar systems, and a method of controlling their operation. Specifically, the present invention relates to provide a way of adjusting the response characteristics of a sway bar system by changing the structure of the typical sway bar links and regulating the modified structure by utilizing an electronically adjustable sway bar link. Said electronically adjustable sway bar link comprises a twin tube cylinder filled with mixed incompressible fluid and pressurized gas and forms a determined volume in order to host pressurized gas higher than fluid flow regulation functions, permitting a directional control valve to always remain fully submerged in incompressible fluid and to modify the fluid path between each tube of said twin tube cylinder, allowing closed or opened fluid flow operation, determined by a controlling device receiving an electronic input and piloting said directional control valve.

This invention allows high performance and simple adjustability of a vehicle's sway bar response characteristics by lowering amount of parts, cost, electric energy consumption, and vehicle's clearance required for installation.

BRIEF DESCRIPTION OF THE DRAWINGS

A clear understanding of the electronically adjustable sway bar link summarized above may be add by examining the figures below. The figures display and reference the assembly, which are not necessarily drawn to scale. Accordingly:

FIG. 3: Illustrates the electronically adjustable sway bar link (16) depicted in FIG. 1 or FIG. 2 and a regular sway bar link (17) mounted to a vehicle sway bar (21), respectively thanks to mounting points (18A) and (18B), and to both opposite vehicle wheel sides respectively thanks to mounting points (19A) and (19B). Said electronically adjustable sway bar link (16) includes an electronically controlled directional valve (15) piloted by an electronic control unit (22). Said vehicle sway bar (21) is mounted to vehicle by mounting brackets (20A) and (20B).

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Furthermore, the term "sway bar" refers to an anti-sway bar, a roll-bar, an anti-roll bar, a stabilizer bar or any similar system, while "hydraulic cylinders" refers to any damper cylinder, such as a shock or similar devices. An "eyelet" refers to the mounting of the hydraulic cylinders shaft to a chassis mounting point.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An electronically adjustable sway bar link and its use is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by referencing the appended figures representing preferred embodiments.

Figure 1:
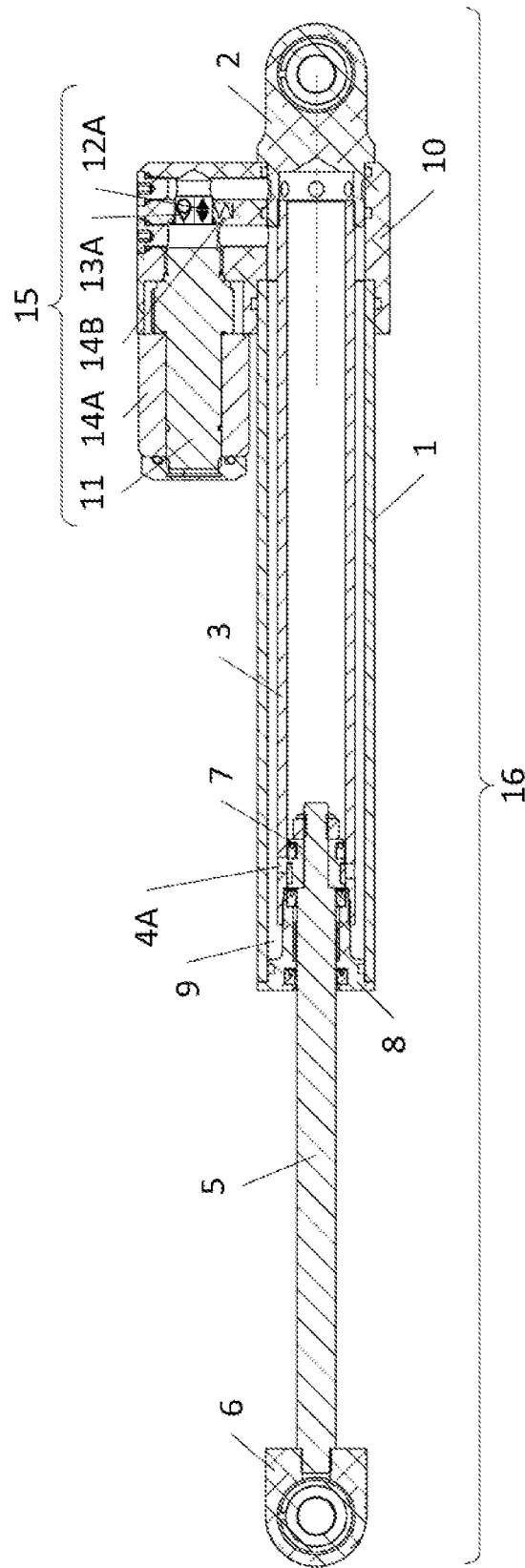
FIG. 1: Illustrates the electronically adjustable sway bar link (16) assembly, composed of: a twin tube cylinder composed of an outer tube (1), a mounting eyelet (2), and an inner tube (3) comprising flow regulation holes (4A); a shaft (5) composed of a piston (7), a mounting eyelet (6), a sealing case (8); and a valve mounting bridge (10) including controlling devices (14A) and (14B) and a directional control valve (11) composed of an open flow configuration (12A) and a check valve configuration (13A).

FIG. 1 depicts an electronically adjustable sway bar link (16) and its components. A shaft assembly comprises a mounting eyelet (6) mounted to a shaft (5) that includes a piston (7), and a scaling case (8). A twin tube cylinder assembly comprises a mounting eyelet (2) mounted to an inner tube (3), comprising flow regulation holes (4A), and an outer tube (1) installed between a hydraulic valve mounting bridge (10) and said sealing case (8). An electronically controlled directional valve (15) is mounted into hydraulic valve mounting bridge (10) and comprises controlling devices (14A) and (14B) and a directional control valve (11) composed of an open flow configuration (12A) and a check valve configuration (13A).

Figure 2:
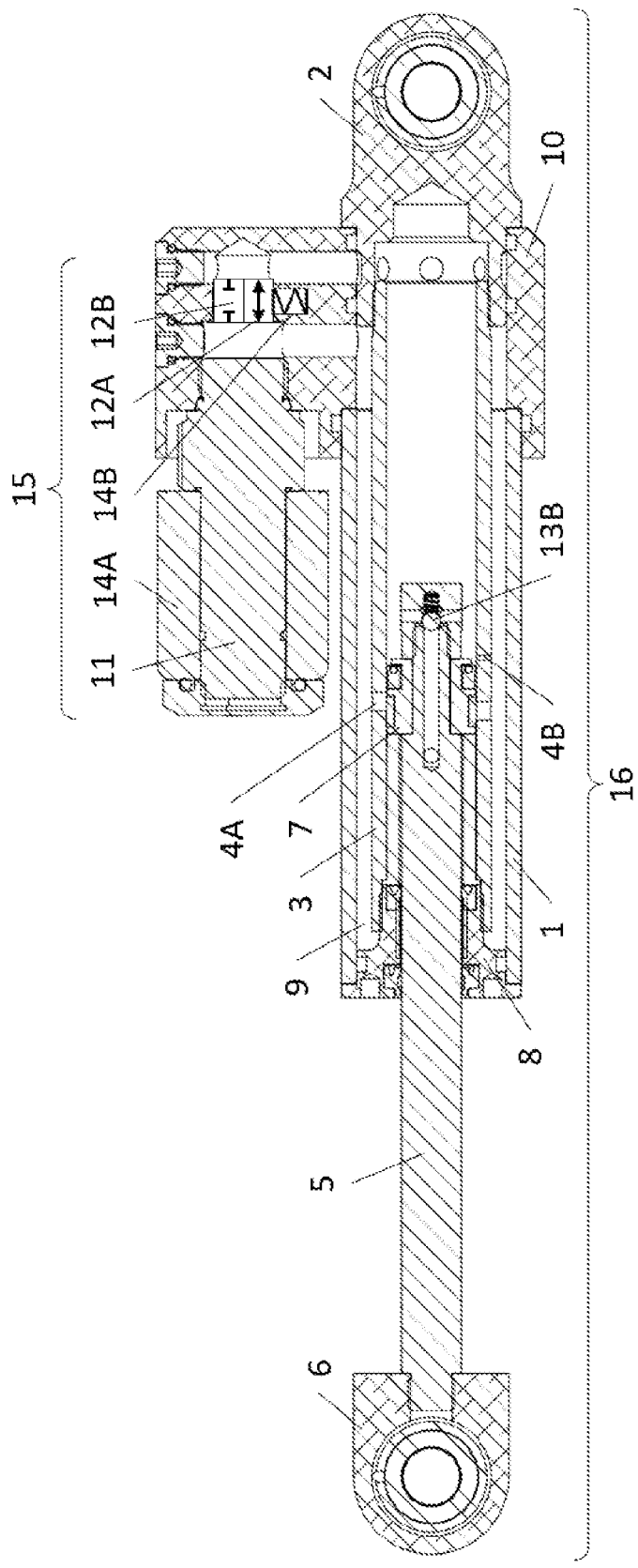
FIG. 2: Illustrates another configuration of the electronically adjustable sway bar link (16) assembly depicted in FIG. 1, where the inner tube (3) comprises flow regulation holes (4A) and a bleed hole (4B), and where the directional control valve (11) is composed of an open flow configuration (12A) and a closed flow configuration (12B). The shaft (5) includes a check valve feature (13B) previously depicted in FIG. 1 as a check valve configuration (13A) of the directional control valve (11).

FIG. 2 depicts an electronically adjustable sway bar link (16) and its components. A shaft assembly comprises a mounting eyelet (6) mounted to a shaft (5) that includes a piston (7), a sealing case (8), and a check valve feature (13B) previously depicted in FIG. 1 as a check valve configuration (13A) of the directional control valve (11). A twin tube cylinder assembly comprises a mounting eyelet (2) mounted to an inner tube (3), comprising flow regulation holes (4A), a bleed hole (4B), and an outer tube (1) installed between a hydraulic valve mounting bridge (10) and said scaling case (8). An electronically controlled directional valve (15) is mounted into hydraulic valve mounting bridge (10) and comprises controlling devices (14A) and (14B) and a directional control valve (11) composed of an open flow configuration (12A) and a closed flow configuration (12B).

Once said electronically adjustable sway bar link (16) is assembled, it forms a determined volume (9) at the upper end of said twin tube cylinder as depicted on FIG. 1 and FIG. 2 in order to host pressurized gas that remains located higher than said flow regulation holes (4A) of said inner tube (3), higher than the sealing function of the piston (7), and higher from said directional control valve (11) located at the lower end of said twin tube cylinder, in order to keep flow regulation functions of said electronically adjustable sway bar link (16) always submerged in incompressible fluid.

FIG. 2 also depicts a bleed hole (4B) located below the sealing function of the piston (7) when said electronically adjustable sway bar link (16) is extended, which adds an additional way for any pressurized gas trapped below the sealing function of the piston (7) to reach said determined volume (9), thus insuring high damping performance of the present invention.

FIG. 3 depicts a vehicle's sway bar system where said electronically adjustable sway bar link (16) links one vehicle's sway bar end (18A) to said vehicle axle end (19A), with said shaft mounting eyelet (6) connected to the upper end of said vehicle's axle or sway bar (18A), and with said twin tube cylinder mounting eyelet (2) connected to the lower end of said vehicle's sway bar or axle (19A).

When in operation, the directional control valve (11) of the electronically adjustable sway bar link (16) depicted in FIG. 1 is held in its said check valve configuration (13A) by controlling device (14B), which only allows fluid to flow from said outer tube (1) to said inner tube (3). As said shaft (5) needs to travel through said twin tube cylinder inner tube (3), said check valve configuration (13A) blocks fluid flow from inner tube (3) to outer tube (1), thus avoiding said shaft (5) to travel through said inner tube (3) and keeping electronically adjustable sway bar link (16) extended.

When in operation, the directional control valve (11) of the electronically adjustable sway bar link (16) depicted in FIG. 2 is held in its said closed flow configuration (12B) by controlling device (14B), which blocks fluid to flow in any direction. The check valve feature (13B) included in shaft (5) only allows fluid to flow from said outer tube (1) to said inner tube (3). As said shaft (5) needs to travel through said twin tube cylinder inner tube (3), said check valve feature (13B) blocks fluid flow from inner tube (3) to outer tube (1), thus avoiding said shaft (5) to travel inside said inner tube (3) and keeping electronically adjustable sway bar link (16) extended, while allowing said shaft (5) to travel outside said inner tube (3) and electronically adjustable sway bar link (16) to return to an extended configuration if previously collapsed.

When said controlling device (14A) receives an electronic input, said controlling device (14A) sets the directional control valve (11) to its said open flow configuration (12A) which allows fluid to flow in any direction from said outer tube (1) to said inner tube (3). As said shaft (5) needs to travel through said twin tube cylinder inner tube (3), said open flow configuration (12A) allows fluid to flow from below said piston (7) in said inner tube (3), through said directional control valve (11), across said outer tube (1), through said flow regulation holes (4A), and finally back in said inner tube (3) below said piston (7), thus allowing said shaft (5) to travel through said inner tube (3) and collapsing electronically adjustable sway bar link (16).

When in operation, the controlling device (14A) receives an electronic input generated by an external electronic control unit (22). Said input is determined manually by vehicle's user through a human interface connected to said external electronic control unit (22), or automatically by an algorithm programmed into said external electronic control unit (22), and calculated with transmitted inputs from vehicle sensors such as speed, roll angle, roll angle rate, lateral acceleration, and steering angle.

Said directional control valve (11) is piloted by said controlling device (14A) received electronic inputs generated by said external electronic control unit (22), and regulates fluid flow between said outer tube and said inner tube in order to change the damping characteristic of the electronically adjustable sway bar link (16).

The operation of controlling device (14A) increases or decreases the response characteristics of the vehicle's sway bar (21).

This electronically adjustable sway bar link is designed to fit any on-road or off-road vehicle, such as automobiles, trucks, recreational vehicles, utility vehicles.

This electronically adjustable sway bar link is designed to work with any style of sway bar systems. This design offers an efficient and compact way of electronically controlling the response characteristics of a vehicle's sway bar, as it is all contained within one outer tube, rather than controlling each sway bar link with its own fluid reserve.

It also provides efficient performance, as sway bar links mounted in such way where pressurized gas remain in the upper end of the damper cylinder, keeps the fluid flow regulation functions always submerge in incompressible fluid.

Electric energy savings is another great advantage of the present electronically controlled adjustment system for sway bars, as specific hydraulic connections allow this system to function safely without using electric energy when not in operation.

Finally, the production cost of such system is lowered as less parts are required for the final assembly, which also allows an easier adaptation on any vehicle as less room around vehicle wheel axles is required for proper mounting.

What is claimed is:

1. An adjustable sway bar link assembly comprising:
  a) a hollow outer tube;
  b) a hollow inner tube spaced apart from and disposed within the outer tube forming a first cavity, the inner tube having:
    i) a second cavity;
    ii) a first mounting eyelet coupled to a first end of the inner tube; and
    iii) a plurality of flow regulation holes disposed around a second end of the inner tube, wherein the first cavity and the second cavity are in fluid communication via the plurality of flow regulation holes;
  c) a valve system coupled to the outer tube, the valve system comprising:
    i) a valve that can move between an open flow configuration, a closed flow configuration and a check-valve configuration;
    ii) a first controlling device configured to move the valve between the check valve configuration and the open flow configuration; and
    iii) a second controlling device configured to move the valve into the closed flow configuration; and
  d) a shaft assembly comprising:
    i) a shaft movable between an extended position and a retracted position, the shaft having:
      (1) a first end coupled to a second mounting eyelet; and
      (2) a second end slidably disposed within the second end of the inner tube, the second end of the shaft having:
        (a) a piston coupled thereto, the piston having a sealing band; and
        (b) a sealing case comprising at least one oil seal.

2. The assembly of claim 1, wherein the second end of the shaft further comprises a check valve.

3. The assembly of claim 1, wherein the first controlling device comprises a solenoid and the second controlling device comprises a spring.

4. The assembly of claim 1, wherein the first cavity and the second cavity contain a mixture of incompressible fluid and pressurized gas.

5. The assembly of claim 1, further comprising an electronic control unit electrically coupled to the first controlling device.

6. The assembly of claim 1, wherein the first controlling device is configured to receive electronic inputs.

7. The assembly of claim 1, further comprising at least one bleed hole disposed along the inner tube, located below the sealing band of the piston when the shaft is in the extended position.

8. An adjustable sway bar link system, the system comprising:
  a) the adjustable sway bar link assembly of claim 1; and
  b) a sway bar of a vehicle,
wherein the second mounting eyelet is coupled to an upper end of the sway bar, an axle of the vehicle, an a-arm of a vehicle, or a trailing arm of a vehicle, and, the first mounting eyelet is coupled to a lower end of the sway bar, the axle of the vehicle an a-arm of the vehicle, or a trailing arm of the vehicle.

9. The assembly of claim 1, wherein the first controlling device is configured to receive electronic inputs and the electronic inputs are generated manually by a user interface.

10. The assembly of claim 9, wherein the electronic inputs are received from an electronic control unit electrically coupled to the first controlling device.

11. The assembly of claim 9, wherein the electronic inputs are generated manually by a user using a user interface connected to the external electronic control unit.

12. The assembly of claim 9, wherein the electronic inputs are generated automatically by an algorithm programmed into an external electronic control unit and calculated with transmitted inputs from at least one vehicle sensor.

13. The assembly of claim 12, further comprising a user interface connected to the external electronic control unit.

14. An adjustable sway bar link assembly comprising:
 a) an outer tube;
 b) an inner tube spaced apart from and disposed within the outer tube forming a first cavity, the inner tube having:
   i) a second cavity;
   ii) a first mounting eyelet coupled to a first end of the inner tube; and
   iii) a plurality of flow regulation holes disposed around a second end of the inner tube, wherein the first cavity and the second cavity are in fluid communication via the plurality of flow regulation holes;
 c) a valve system comprising:
   i) a valve that can move between three flow configurations; and
 d) a shaft assembly comprising:
   i) a shaft movable between an extended position and a retracted position, the shaft having:
     (1) a first end coupled to a second mounting eyelet; and
     (2) a second end slidably disposed within the second end of the inner tube, the second end of the shaft having a piston coupled thereto.

15. The assembly of claim 14, wherein the second end of the shaft further comprises a check valve.

16. The assembly of claim 14, wherein the valve system further comprises a first controlling device configured to move the valve between two flow configurations, and a second controlling device configured to move the valve into a third flow configuration.

17. The assembly of claim 16, wherein the first controlling device comprises a solenoid and the second controlling device comprises a spring.

18. The assembly of claim 14, wherein the first cavity and the second cavity contain a mixture of incompressible fluid and pressurized gas.

19. The assembly of claim 14, further comprising an electronic control unit electrically coupled to the first controlling device.

20. The assembly of claim 19, further comprising a user interface connected to the external electronic control unit.

21. The assembly of claim 14, wherein the first controlling device is configured to receive electronic inputs.

22. The assembly of claim 14, wherein the first controlling device is configured to receive electronic inputs and the electronic inputs are generated manually by a user interface.

23. The assembly of claim 21, wherein the electronic inputs are generated automatically by an algorithm programmed into an external electronic control unit and calculated with transmitted inputs from at least one vehicle sensor.

24. The assembly of claim 21, wherein the electronic inputs are received from an electronic control unit electrically coupled to the first controlling device.

25. The assembly of claim 24, wherein the electronic inputs are generated manually by a user using a user interface connected to the external electronic control unit.

26. The assembly of claim 14, further comprising at least one bleed hole disposed along the inner tube.

27. An adjustable sway bar link system, the system comprising:
 a) the adjustable sway bar link assembly of claim 14; and
 b) a sway bar of a vehicle,
wherein the second mounting eyelet is coupled to an upper end of the sway bar, an axle of the vehicle, an a-arm of a vehicle, or a trailing arm of a vehicle, and, the first mounting eyelet is coupled to a lower end of the sway bar, the axle of the vehicle an a-arm of the vehicle, or a trailing arm of the vehicle.

* * * * *